United States Patent [19]

Kobayashi

[11] Patent Number: 5,499,286

[45] Date of Patent: Mar. 12, 1996

[54] DIGITAL RADIO TELEPHONE

[75] Inventor: Takeo Kobayashi, Tokyo, Japan

[73] Assignee: NEC Corporation, Tokyo, Japan

[21] Appl. No.: 105,952

[22] Filed: Aug. 13, 1993

[30] Foreign Application Priority Data

Aug. 13, 1992 [JP] Japan .................................. 4-215873
Apr. 26, 1993 [JP] Japan .................................. 5-099028

[51] Int. Cl.$^6$ .................................................. H04M 1/00
[52] U.S. Cl. .......................................................... 379/58
[58] Field of Search ............................... 379/58, 63, 59, 379/57, 61; 34/825.44

[56] References Cited

U.S. PATENT DOCUMENTS 5,054,053  10/1991  Sakanishi et al. ..................... 379/63
5,371,779  12/1994  Kobayashi ............................. 379/58

FOREIGN PATENT DOCUMENTS 0307193  3/1989  European Pat. Off. ....... H04M 1/274

*Primary Examiner*—Edward L. Coles, Sr.
*Assistant Examiner*—Fan Lee
*Attorney, Agent, or Firm*—Sughrue, Mion, Zinn, Macpeak & Seas

[57] ABSTRACT

A digital radio telephone gives information to user in speech form by using an advanced speech coder/decoder in a digital radio communication network. Such an advanced coder/decoder can reduce quantity of coded data to be stored. The digital radio telephone according to a first embodiment includes a speech coder/decoder, a speech information memory, a speech information retrieval table, an operational information controller, and a speech information reading section. A plurality of predetermined speech signals are stored in the speech information memory in coded form. The speech information retrieval table stores information for producing a voice message to the user using the items in the speech information memory. To give the voice message to the user, the information is read out by the operational information controller and necessary items of speech signals are read out by the speech information reading section in sequence according to the read information. The speech voice coder/decoder decodes the items so as to produce the voice message in the same way as with digital speech voice signals received by the digital radio telephone. According to a second embodiment, the user can store his own voice into the speech information memory in coded form, and when the user operates the telephone, the user will hear the voice messages in his own voice.

4 Claims, 7 Drawing Sheets

FIG. 4

| OPERATIONAL INFORMATION NUMBER FOR READING | NUMBER OF ITEMS OF CODED SPEECH | INITIAL ADDRESSES OF NECESSARY ITEMS OF CODED SPEECH INFORMATION | | |
|---|---|---|---|---|
| OPERATIONAL INFORMATION OP1 | 6 | INITIAL ADDRESS AD1 OF 1ST CODED SPEECH INFORMATION | INITIAL ADDRESS AD2 OF 6TH CODED SPEECH INFORMATION | ... |
| OPERATIONAL INFORMATION OP2 | 5 | INITIAL ADDRESS AD3 OF 1ST CODED SPEECH INFORMATION | INITIAL ADDRESS AD4 OF 5TH CODED SPEECH INFORMATION | ... |
| ... | ... | ... | ... | ... |
| OPERATIONAL INFORMATION OP(m-1) | 4 | INITIAL ADDRESS AD5 OF 1ST CODED SPEECH INFORMATION | INITIAL ADDRESS AD6 OF 4TH CODED SPEECH INFORMATION | ... |
| OPERATIONAL INFORMATION OPm | 7 | INITIAL ADDRESS AD7 OF 1ST CODED SPEECH INFORMATION | INITIAL ADDRESS AD8 OF 7TH CODED SPEECH INFORMATION | ... |

6 SPEECH INFORMATION RETRIEVAL TABLE

FIG. 7

| OPERATIONAL INFORMATION NUMBER FOR WRITING | STORAGE AREA INFORMATION OF DIGITAL SPEECH SIGNAL | |
|---|---|---|
| | INITIAL ADDRESS OF STORAGE AREA | FINAL ADDRESS OF STORAGE AREA |
| OPERATIONAL INFORMATION WOP1 | AD11 | AD12 |
| OPERATIONAL INFORMATION WOP2 | AD13 | AD14 |
| ... | ... | ... |
| OPERATIONAL INFORMATION WOP(m-1) | AD15 | AD16 |
| OPERATIONAL INFORMATION WOPm | AD17 | AD18 |

6a SPEECH INFORMATION RETRIEVAL TABLE

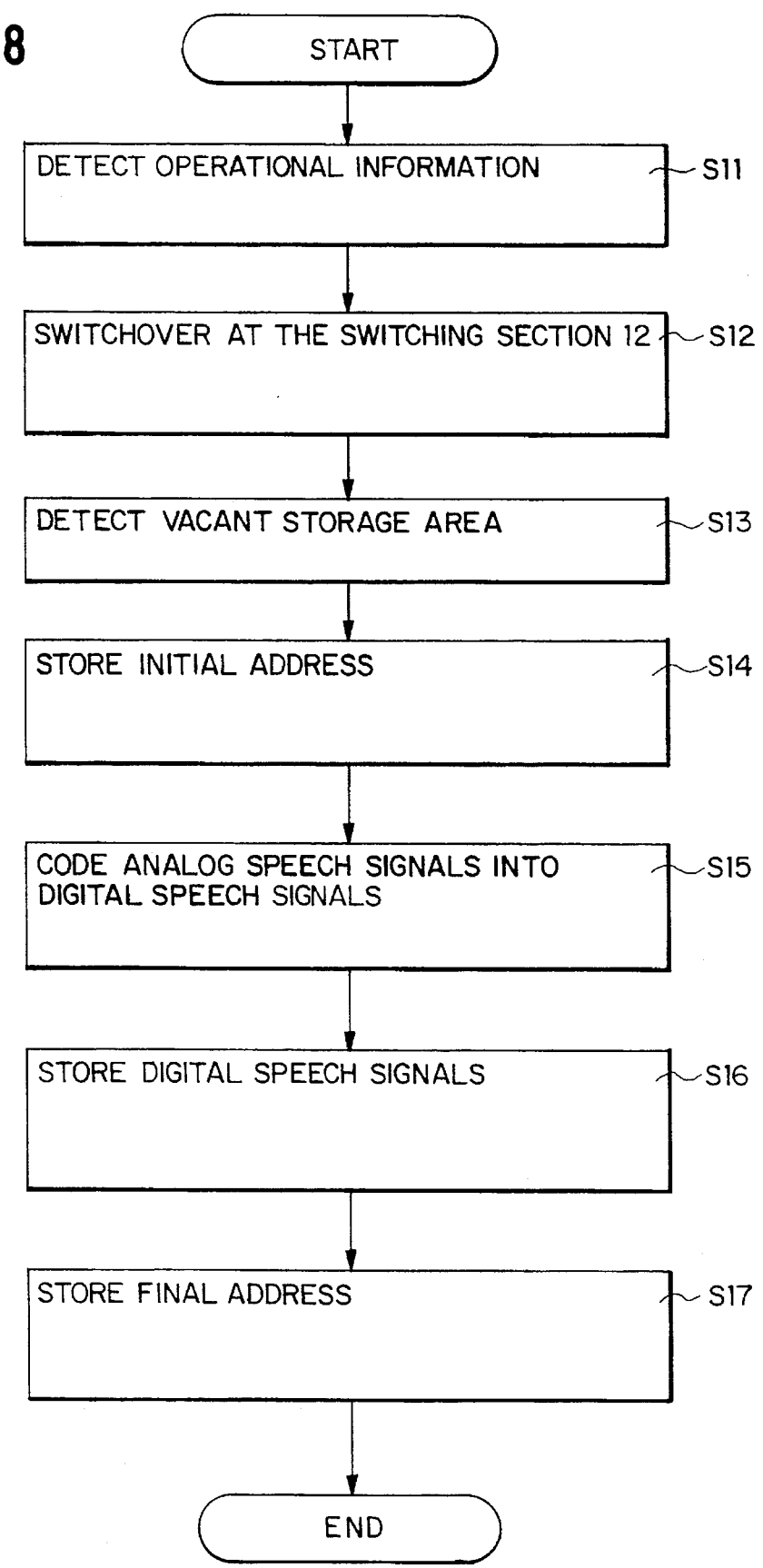

DIGITAL RADIO TELEPHONE

BACKGROUND OF THE INVENTION

1. Field of the Invention

The present invention relates to a digital radio telephone, and more particularly to a digital radio telephone which gives information to a user in the form of speech.

2. Description of the Related Art

Recently, some telephone equipment has had a convenient function of giving users information, in the form of a synthesized voice, the information relating to, for example, instructions on use, contents of registration stored in the telephone, time, and the like. This equipment includes a speech or voice synthesizer and a memory to generate the synthesized voice.

To better understand the present invention, a brief reference will be made to a prior art telephone of this kind, shown in FIG. 1. Such a radio telephone 100 has an antenna 101, a radio telephone section 102, a handset 103, an operational section 104, a switching section 105 and a speech or voice synthesizer section 106. The radio telephone section 102 has the basic function of radio telephone communication. The switching section 105 is provided for switching over between the output of the speech synthesizer section 106 and analog speech signals during conversation from the radio telephone section 102 as voice signals to be outputted to the handset 103. The speech synthesizer section 106 is constituted by a conventional integrated circuit (IC).

For example, when the user of this radio telephone presses a function key (e.g. a speed-dial button or an one-touch dial button) of the operational section 104, the speech synthesizer section 106 detects operational information which the user inputs from the operational section 104. Then the speech synthesizer section 106 controls the switching section 105 to send out analog speech signals corresponding to the functional content of the pressed function key (e.g., the memorized telephone number) from the speech synthesizer section 106 to the handset 103, in response to the operational information.

Since this radio telephone sends out analog speech signals by utilizing the speech synthesizer section 106, there is a problem in that, as the amount of operational information increases, the memory capacity of the speech synthesizer section 106 has to be expanded to synthesize the analog speech corresponding to all of the operational information. That is, since the conventional speech synthesizer IC does not have high encoding efficiency, a large capacity memory is required, making the radio telephone expensive.

SUMMARY OF THE INVENTION

It is an object of the present invention to provide a digital radio telephone having the benefit of reducing the memory capacity required to store speech signals when the amount of necessary operational information increases, in contrast to a conventional speech synthesizer.

Another object of the present invention is to provide a digital radio telephone which enables the user to store functional content corresponding to the function key using the user's own voice, and to confirm the stored functional content by the user's voice without requiring an additional speech synthesizer.

In accordance with the present invention, the inventive digital radio telephone comprises:

a radio telephone section for transmitting and receiving digital speech signals via an antenna;

a speech voice coder/decoder for generating analog speech signals to a user of the digital radio telephone, and said digital speech signals to be transmitted by the radio telephone section;

a first memory for storing items of digital speech signals, each of the items having a predetermined speech pattern;

a second memory for storing information for producing a voice message by using said items of the digital speech signals stored in said first memory; and read control means, responsive to an operation of said user, for controlling reading out said items of the digital speech signals according to said information stored in said second memory so as to produce said voice message by said speech voice coder/decoder.

BRIEF DESCRIPTION OF THE DRAWINGS

The above and other objects and features of the present invention will become more apparent from the following detailed description when taken in conjunction with the attached drawings.

FIG. 4 is a diagram showing an example of storage in the table 6 in FIG. 2;

FIG. 7 is a diagram showing an example of storage of the table 6a in FIG. 6; and FIG. 8 is a flowchart showing the operation of the second embodiment.

In the drawings, the same reference numerals denote the same structural elements.

DESCRIPTION OF THE PREFERRED EMBODIMENTS

Figure 2:
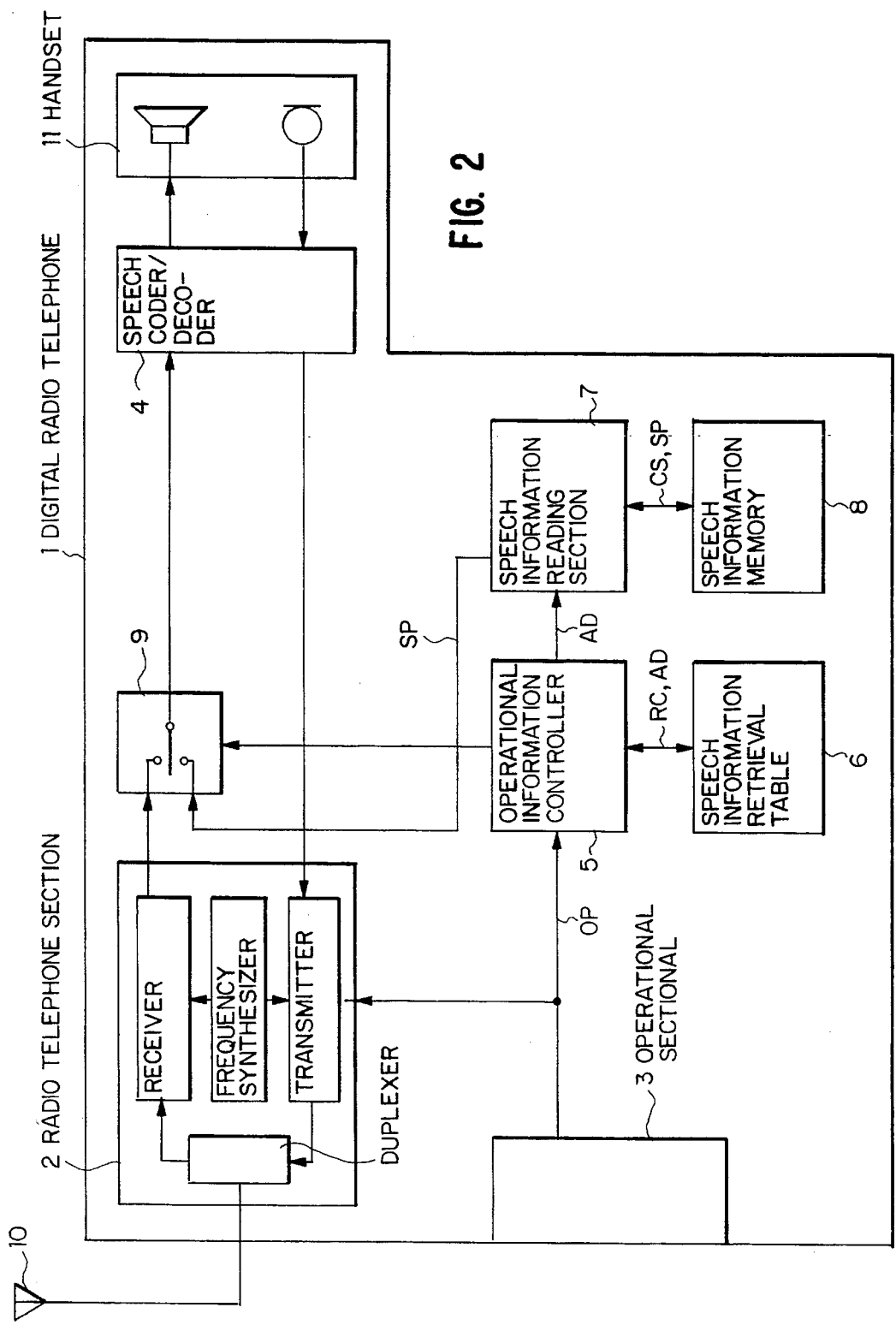
FIG. 2 is a block diagram showing a first embodiment of the present invention.
Figure 5:
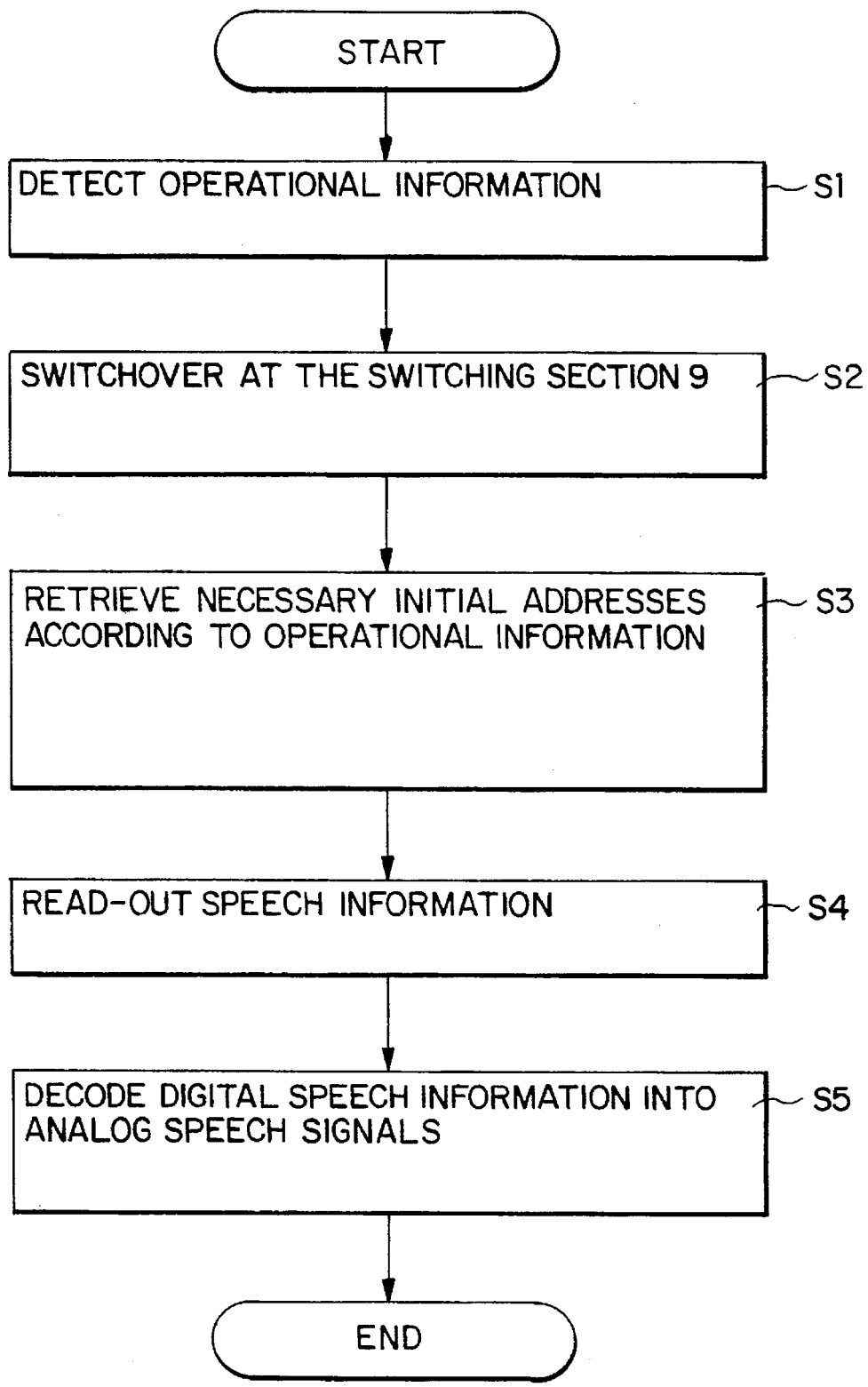
FIG. 5 is a flowchart showing the operation of the first embodiment.

Referring to FIG. 2, a digital radio telephone 1 embodying the present invention includes a digital radio telephone section 2, a hand set 11, an antenna 10, a speech coder/decoder 4, an operational section 3, a speech information memory 8, a speech information retrieval table 6, a speech information reading section 7, a switching section 9 and an operational information controller 5.

The digital radio telephone section 2 transmits and receives coded speech signals via the antenna 10. This section 2 may be constituted by a conventional circuit including a duplexer, a transmitter, a receiver, a frequency synthesizer and amplifiers (not shown).

The handset 11 transmits and receives analog speech signals.

Figure 1:
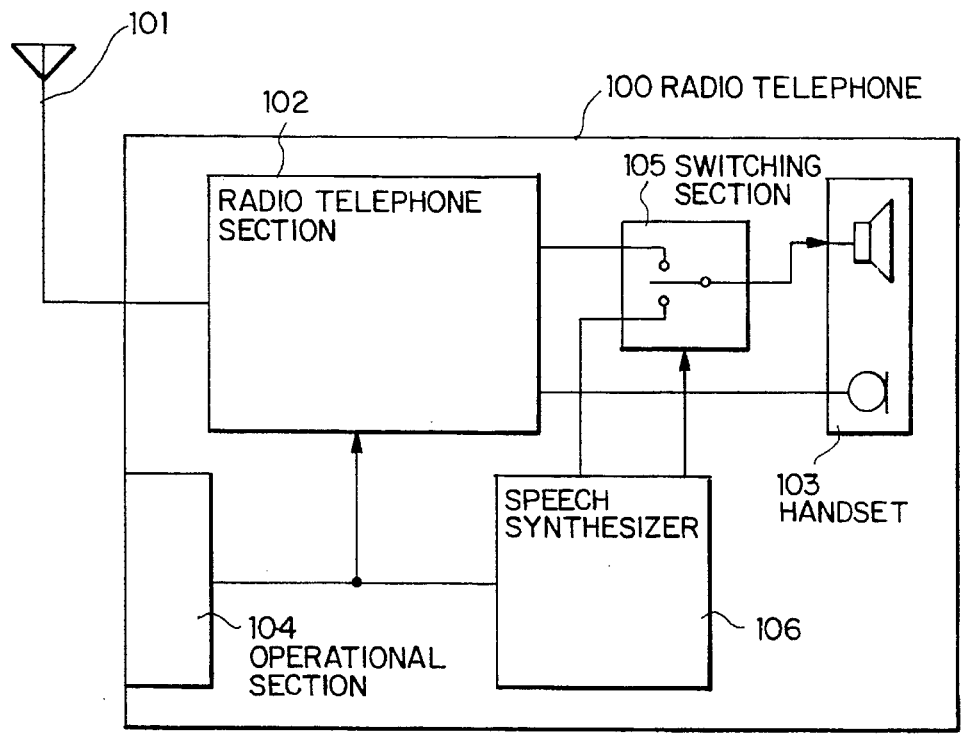
FIG. 1 is a block diagram showing an example of a radio telephone according to the prior art.

The speech coder/decoder 4 is provided for decoding the coded speech signals (digital speech signals) to analog speech signals and sending out the analog speech signals to the handset 11, and for coding the analog speech signals from the handset 11 to coded speech signals and sending out the coded speech signals to the radio telephone section 2. The speech coder/decoder 4 may use the Vector-Sum Excited Linear Predictive (VSELP) coding system or the Regular Pulse Excitation-Long Term Predictive (RPE-LTP) coding system as a code/decode method. These systems, which are used in a mobile telephone network, can reduce a necessary quantity of coded data as compared with the conventional speech synthesizer shown in FIG. 1, because these systems use advanced code/decode methods so as to compress data for transmission by using a limited radio frequency band. Therefore, the amount of memory capacity necessary to store the same speech information in this invention can be reduced as compared to that of the prior art telephone. Furthermore, these systems offer high speech quality.

The operational section 3 is provided for a user to input operational information, and may be constituted by push buttons or keys, but is not limited thereto. This section 3 includes dial keys and function keys (for example, a re-dial key, speed-dial keys, etc.) When one of the keys in the section 3 is operated, operational information OP corresponding to the pressed key is outputted from the section 3 to the operational information controller 5.

Figure 3:
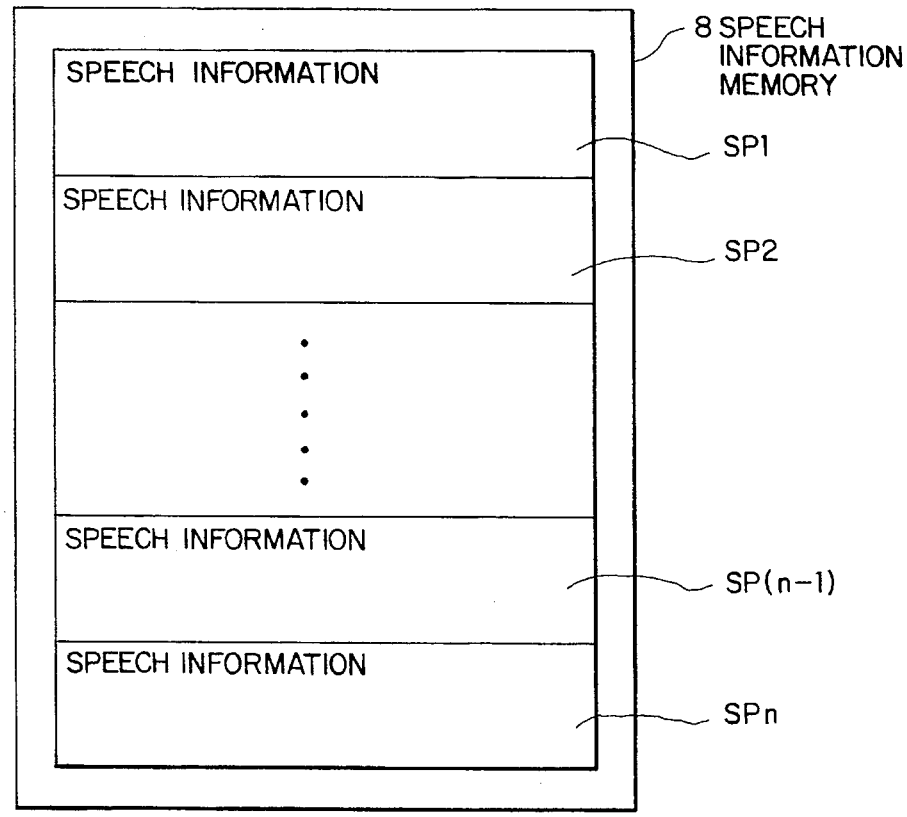
FIG. 3 is a diagram showing an example of the configuration of the memory 8 in FIG. 2.

The speech information memory 8 stores a predetermined plurality of items (SP1 to SPn) of coded speech information (digital speech signals) having a fixed pattern as shown in FIG. 3.

The speech information retrieval table 6 stores information for reading out necessary speech information from the memory 8 to produce speech as shown in FIG. 4. That is, the table 6 has a table containing a plurality of items of operational information (operational information OP1 to OPm), each of the items of the operational information OP1 to OPm including the number of items of coded speech information and all initial addresses of each item of coded speech information in a predetermined sequence in which the items of coded speech information are read out. For example, as shown 6 items of coded speech information are necessary to make synthesized speech corresponding to the operational information OP1, and an initial address of the first coded speech information in the memory 8 is AD1.

The speech information reading section 7 reads out the coded speech information from the speech information memory 8 according to the output of the table 6.

The switching section 9 is provided for switching over between the coded speech information from the information reading section 7 and coded speech signals from the radio telephone section 2, and outputting either one of these to the speech coder/decoder 4.

The operational control section 5 controls the speech information retrieval table 6, the speech information reading section 7 and the switching section 9 in accordance with the operational information from the operational section 3.

Next will be described the operation of the first embodiment with reference to FIGS. 2 to 5.

In the normal state, the switching section 9 connects the radio telephone section 2 to the speech coder/decoder 4 to enable conversation between the user of this radio telephone 1 and another subscriber. That is, the digital speech signals received by the radio telephone section 2 are sent to the speech coder/decoder 4 via the switching section 9, and these signals are decoded into analog speech signals. Then, the analog signals are sent to the handset 11.

On the other hand, the analog speech signals from the microphone of the handset 11 are coded by the speech coder/decoder 4, and are sent out as coded speech signals to the radio telephone section 2 via the switching section 9.

When the user operates one of the function keys, for example a speed-dial key, in the operational section 3 so as to confirm the registration content of the speed-dial key in an on-hook state, the operational section 3 outputs reading operational information (for example, OP1) corresponding to the operated key. The operational information controller 5 detects the operational information OP1 from the operational section 3 (step S1 in FIG. 5).

In response to the operational information OP1, the controller 5 controls the switching section 9 so as to connect the speech information reading section 7 to the speech coder/decoder 4 (step S2).

Next, the control section 5 sends out a retrieval command RC corresponding to the operational information OP1 to the speech information retrieval table 6, successively retrieves a number of speech information initial addresses of operational information corresponding to the retrieval command RC as the number of stored items of coded speech information, and sends out retrieved addresses AD to the speech information reading section 7 (step S3). In the case of the operational information OP1, the number "6" and the six initial addresses AD1, . . . ,AD2 are retrieved.

On the basis of the inputted speech information initial addresses AD, the speech information reading section 7 sends out a control signal CS to the speech information memory 8, and a plurality of items of coded speech information (i.e., a series of digital speech signals) SP from the speech information memory 8 to the speech coder/decoder 4 via the switching section 9 as digital speech signals (step S4).

The speech coder/decoder 4 decodes the coded speech signals SP into analog speech signals and sends them out to the handset 11 (step S5). Thus, the user can hear, in voice form, the stored telephone number corresponding to the pressed speed-dial key.

Next will be described a second embodiment of the present invention.

Figure 6:
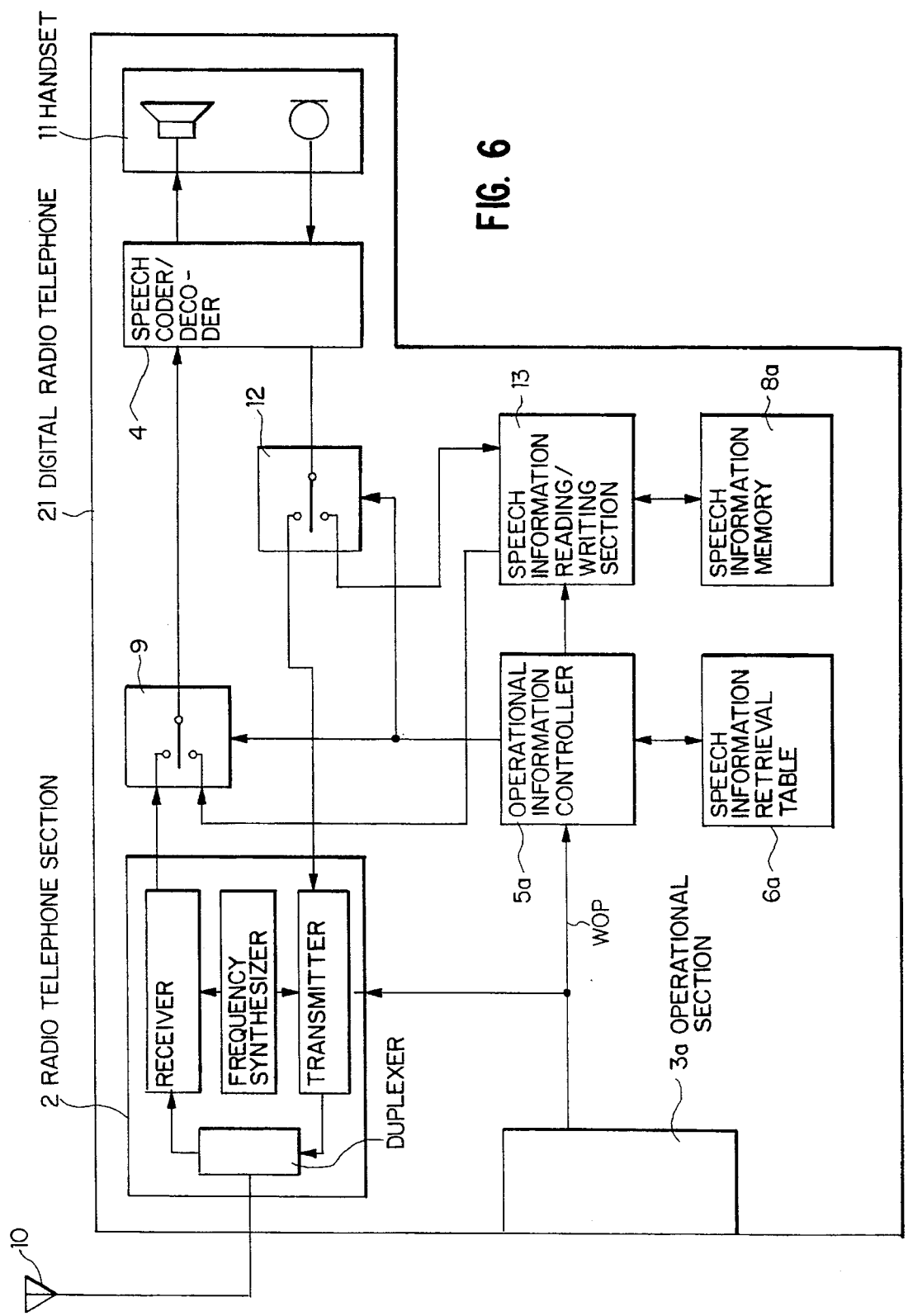
FIG. 6 is a block diagram showing a second embodiment of the present invention.

A digital radio telephone 21 shown in FIG. 6, in which the same constituent elements as in the first embodiment (FIG. 2) are assigned the same respective numerals, has a configuration in which the different constituent elements are an operational section 3a, a speech information memory 8a, a speech information retrieval table 6a, a speech information reading/writing section 13, a switching section 12 and an operational information controller 5a.

The operational section 3a is provided for inputting a plurality of read operational information and a plurality of write operational information. The operational section 3a may be constituted by push buttons or keys as in section 3 of the first embodiment.

The speech information memory 8a stores a predetermined plurality of items of coded speech information as in the memory 8 of the first embodiment and digital speech signals resulting from the coding of analog speech signals from the handset 11 by the speech coder/decoder 4.

The speech information retrieval table 6a stores the same information as the memory 6 of the first embodiment for reading operational information and writing sequence information for digital speech signals according to a plurality of items of writing operational information. That is, as shown in FIG. 7, the writing sequence information is storage area information having the initial address and the final address of storage area in the speech information memory 8a.

The switching section 9a is provided for switching over between the radio telephone section 2 and the speech information reading/writing section 13 for outputting digital speech signals to the speech coder/decoder 4.

The operational information controller 5a controls the speech information retrieval table 6a, the speech information reading/writing section 13 and the switching sections 9 and 12 in accordance with the reading operational information and the writing operational information from the operational section 3a.

Next will be described the operation of the second embodiment with reference to FIGS. 6 to 8. The description of the operation to read out predetermined coded speech information from the speech information memory 8a is not necessary, since it is the same as in the case of the first embodiment.

The following description refers to a case in which one of the free function keys, which can set the functions in the operational section 3a as desired, is pressed down, so that analog speech inputted from the microphone of the handset 11 can be used as speech information to explain the content of the function setting of the pressed free function key. That analog speech is coded and stored as digital speech signals in the speech information memory 8a.

First, write operational information is inputted from the operational section 3a to memorize the user's speech in advance. For example, when one specific function key denoting a write operation (write-key) and another function key having the free function are pressed, this operation denotes write operational information WOP1.

The operational information controller 5a detects this write operational information WOP1 from the operational section 3a (step S11 in FIG. 8), and controls the switching section 12 so as to output coded speech signals from the speech coder/decoder 4 to the speech information writing/reading section 13 (step S12).

Next, the operational information controller 5a detects a vacant storage area in the speech information memory 8a from the speech information retrieval table 6a corresponding to the operational information WOP1 (step S13), stores the initial address AD11 of the vacant storage area into the speech information retrieval table 6a as shown in FIG. 7, and sequentially sends out addresses, beginning with the initial address AD11 of this storage area, to the speech information reading/writing section 13 (step S14).

The user's speech inputted from the microphone of the handset 11 is coded into coded speech signals by the speech coder/decoder 4 (step S15), and sent to the speech information reading/writing section 13 via the switching section 12.

The speech information reading/writing section 13 writes the coded speech signals from the speech coder/decoder 4 into the vacant storage area of the speech information memory 8a according to the addresses from the operational information controller 5a (step S16).

When operational information of completion for write operational information WOP1 from the operational section 3a is inputted, the operational information controller 5a suspends the speech information reading/writing section 7a from the writing operation, stores the final address AD12 of the storage area for write operational information WOP1 into the speech information retrieval table 6a as shown FIG. 7, and thereby completes the writing operation for write operational information WOP1 (step S17). This causes the functional content set by the free function keys to be stored into the speech information memory 8a. For example, the user can set additional information (called subscriber's name, company's name, etc,) corresponding to the speed-dial key.

Next, when a new voice message for another function to be set for another free function key is to be stored into the speech information memory 8a as digital speech signals, it is accomplished, in a manner similar to that described above, by inputting additional write operational information by pressing down the specific function key denoting write operation and another free function key of the operational section 3a.

When digital speech signals already stored in the speech information memory 8a are to be read out, for instance to read out digital speech signals stored with write operational information WOP1, by pressing the free function key whose function was set first and one specific function key (read-key) denoting a read operation from the operational section 3a, the functional set content of the pressed free function key can be heard from the receiver of the handset 11 by substantially the same operation as in the first embodiment.

Although the present invention has been fully described by way of a preferred embodiment thereof with reference to the accompanying drawings, various changes and modifications will be apparent to those having skill in this field. Therefore, unless these changes and modifications otherwise depart from the scope of the present invention, they should be construed as included therein.

What is claimed is:

1. A digital radio telephone comprising:

radio communication means for transmitting and receiving digital speech signals via an antenna;

a speech coder/decoder for generating analog speech signals to a user of the digital radio telephone and said digital speech signals to be transmitted by the radio communication means;

first memory means for storing items of digital speech signals, each of the items having a predetermined speech pattern;

second memory means for storing first information for producing a voice message by using said items of digital speech signals stored in said first memory means;

read control means, responsive to an operation of said user, for controlling reading out of said times of digital speech signals according said first information stored in said second memory means, said speech coder/decoder producing said voice message accordingly; and switching means for selecting one of said digital speech signals from said radio communication means and said items of the digital speech signals from said first memory means for output to said speech coder/decoder.

2. A digital radio telephone comprising:

radio communication means for transmitting and receiving digital speech signals via an antenna;

a speech coder/decoder for generating analog speech signals to a user of the digital radio telephone and said digital speech signals to be transmitted by the radio communication means;

first memory means for storing items of digital speech signals, each of the items having a predetermined speech pattern;

second memory means for storing first information for producing a voice message by using said items of digital speech signals stored in said first memory means;

read control means, responsive to an operation of said user, for controlling reading out of said times of digital speech signals according said first information stored in said second memory means, said speech coder/decoder producing said voice message accordingly;

write control means, responsive to a user writing operation, for controlling writing of said digital speech signals, which are coded from speech of said user by said speech coder/decoder, into said first memory means; and switching means for selecting one of said radio communication means and said first memory means to output the digital speech signals of the subscriber coded by the speech coder/decoder.

3. A digital radio telephone comprising:

radio telephone means for transmitting and receiving coded speech signals;

a handset for transmitting and receiving analog speech signals;

a speech coder/decoder for decoding and sending out coded speech signals from said radio telephone means to said handset, and coding and sending out analog speech signals from said handset to said radio telephone means;

operational means for inputting a plurality of items of operational information;

a speech information memory for storing a predetermined number of items of coded speech information;

a speech information retrieval table for storing the number of items of coded speech information, each corresponding to one of said plural items of operational information, and the initial address of each position in a predetermined sequence in which the items of coded speech information are read out of said speech information memory;

speech information reading means for reading out said coded speech information from said speech information memory according to said initial address retrieved from the speech information retrieval table;

switching means for selectively outputting the coded speech information from said speech information reading means and coded speech signals from said radio telephone means to said speech coder/decoder; and operational information control means for controlling said speech information retrieval table, said speech information reading means and said switching means in accordance with said inputted operational information from said operational means.

4. A digital radio telephone comprising:

radio telephone means for transmitting and receiving coded speech signals;

a handset for transmitting and receiving analog speech signals;

a speech coder/decoder for decoding and sending out coded speech signals from said radio telephone means to said handset, and coding and sending out analog speech signals from said handset to said radio telephone means;

operational means for inputting first and second pluralities of items of operational information;

a speech information memory for storing a predetermined plurality of items of coded speech information and digital speech signals coded by the speech coder/decoder;

a speech information retrieval table for storing, together with the number of items of coded speech information, each corresponding to one of said first plurality of items of operational information, and the initial address of each position in a predetermined sequence in which the items of coded speech information are read out of said speech information memory, writing sequence information for said digital speech signals according to said second plurality of items of operational information, inputted from said operational means, and the initial addresses and the final addresses of storage areas in said speech information memory corresponding to the writing sequence information;

speech information reading/writing means for reading out said coded speech information from said speech information memory and said digital speech signals, and for writing said digital speech signals into said speech information memory;

first switching means for selectively outputting one of the coded speech information from said speech information reading/writing means and the coded speech signals from said radio telephone means to the speech coder/decoder;

second switching means for selectively outputting said digital speech signals from said speech coder/decoder to one of said radio telephone means and said speech information reading/writing means; and operational information control means, responsive to an output of said operational means, for controlling said speech information retrieval table, said speech information reading/writing means, and said first and second switching means.

* * * * *